United States Patent [19]

Fukatsu

[11] Patent Number: 5,229,597
[45] Date of Patent: Jul. 20, 1993

[54] IMAGE PICKUP DEVICE SUITABLE FOR DIMENSIONAL MEASUREMENT IMAGE PICKUP EQUIPMENT INCLUDING A VERNIER PIXEL ARRAY

[75] Inventor: Yasushi Fukatsu, Yokohama, Japan

[73] Assignee: Kabushiki Kaisha Toshiba, Kawasaki, Japan

[21] Appl. No.: 721,301

[22] Filed: Jun. 26, 1991

[30] Foreign Application Priority Data

Jul. 2, 1990 [JP] Japan ................... 2-175071

[51] Int. Cl.$^5$ .................................. H01J 40/14
[52] U.S. Cl. .................. 250/208.2; 250/560
[58] Field of Search ............. 250/211 R, 211 J, 208.1, 250/208.2, 208.3, 237 R, 237 G, 560; 356/400, 401

[56] References Cited

U.S. PATENT DOCUMENTS

| | | | |
|---|---|---|---|
| 4,200,788 | 4/1980 | Agulnek | 250/208.1 |
| 4,412,745 | 11/1983 | Ohtomo et al. | 250/237 G |
| 4,781,463 | 11/1988 | Rosen et al. | 356/394 |

Primary Examiner—David C. Nelms
Attorney, Agent, or Firm—Foley & Lardner

[57] ABSTRACT

An image pickup device for dimensional measurement comprises a first pixel train serving as a main scale, comprised of pixels arranged at a first pitch (Pm); and a second pixel train serving as a vernier, comprised of pixels arranged at a second pitch (Ps) set to a length different from the first pitch (Pm), and disposed in parallel to the first pixel train. The second pixel train may employ an arrangement comprising N pixel trains, in which adjacent pixel trains are positionally shifted in succession by the second pitch (Ps). In this case, the second pitch (Ps) has the relationship of Pm/N (N is an integer equal to 3 or more) with respect to the first pitch (Pm).

12 Claims, 3 Drawing Sheets

IMAGE PICKUP DEVICE SUITABLE FOR DIMENSIONAL MEASUREMENT IMAGE PICKUP EQUIPMENT INCLUDING A VERNIER PIXEL ARRAY

BACKGROUND OF THE INVENTION

This invention relates to an image pickup device, and more particularly to an image pickup device suitable for dimensional measurement.

As an example of the conventional image pickup device, the pixel arrangement in an image pickup device 1 such as a CCD (charge coupled device) line image sensor, etc. is shown in FIG. 1. As seen from this figure, pixels 3 are arranged in a row at a pitch P to constitute a pixel train 2. An image of an object to be measured is formed on the arrangement of the pixel train 2 to carry out photoelectric conversion, thus to provide image information.

However, in the case of such an image pickup device 1, the resolution thereof is determined by the pitch P of the pixels 3. As a result, the measurement accuracy is restricted by the length of the pitch P. If the pitch P is caused to be small, the resolution becomes high, but there is a limit in production. In general, the minimum pitch P of the pixels 3 put into practice is 7 $\mu$m. Resolution more than that value can not be provided.

Furthermore, if the dimension or size of the pixel 3 becomes small, the quantity of charges which can be stored is decreased, leading to a lowered SN ratio (hereinafter simply referred to S/N). Accordingly, it is extremely difficult to increase the resolution of the image pickup device 1 for improving the measurement accuracy.

SUMMARY OF THE INVENTION

With the above-mentioned circumstances in view, an object of this invention is to provide an image pickup device capable of measuring the dimension of an object to be measured having a dimension finer or smaller than the pitch of the pixel without lowering the S/N.

To achieve the above mentioned object, an image pickup device according to this invention comprises a first pixel train serving as a main scale comprised of pixels arranged at a pitch Pm, and at least one second pixel train serving as a vernier comprised of pixels arranged at a pitch Ps different from the pitch Pm, and disposed in parallel to the first pixel train.

The image pickup device of the invention may include at least two second pixel trains wherein respective pixels are arranged in such a manner that they are staggered each other.

Preferably, the image pickup device of the invention may include N second pixel trains each comprised of pixels arranged at a pitch Ps of (N−1) Pm/N (N is an integer equal to 3 or more) wherein respective pixel trains are arranged in such a manner that they are staggered by Pm/N in succession in one direction. The image pickup device of the invention may further include a pixel train serving as a main scale comprised of pixels staggered at a pitch Pm, and disposed in parallel to the first pixel train.

Furthermore, in the case where one group of pixel trains is constituted by the first and second pixel trains, there may include a similar pixel train group in a direction perpendicular to the above-mentioned pixel train group.

In the case where only the first pixel train as the main scale is provided, a boundary line formed on the pixels when an image of an object to be measured is projected thereon is only passed on one pixel. For this reason, it is impossible to provide a measurement accuracy higher than a value corresponding to the length of the pixel pitch Pm. However, in the case where the image pickup device includes the second pixel train as a vernier, the above-mentioned boundary line is permitted to be passed on different pixels shifted at each start positions. There exist pixels interchanging from black output to a white output on the boundary line at the main scale and the vernier, respectively. An employment of such a stagger arrangement permits measurement of an object finer than the pixel pitch Pm. Thus, the measurement accuracy is improved.

In the case where at least two second pixel trains are provided as the vernier, and respective pixels are arranged in a manner that they are shifted in phase, since the boundary line of an projected image is passed on at least two pixels which are shifted at start positions each other or more as the main scale and the vernier, measurement of a finer object can be made by the phase difference between pixels interchanging from a black output to a white output on the boundary line.

Furthermore, in the case where there are provided N second pixel trains each comprised of pixels arranged at a pitch Ps of (N−1) Pm/N, and such pixel trains are arranged in a manner that they are staggered by Pm/N in succession in one direction, when attention is drawn to the portion along the boundary line of a projected image, there exists a pixel suddenly changing from a black output to a white output. Accordingly, with respect to such a pixel, when it is assumed that a projected image covers the area corresponding to a threshold value of which output varies, it is possible to determine the position through which the boundary line is passed at the main scale from the position difference (the stagger) between the above-mentioned pixel and the main scale. In this case, since respective pixel trains ar staggered by Pm/N, it is possible to determine the dimension with the accuracy of Pm/N.

In the case where there is further provided a main scale, when an approach is employed to adjust an angle for projecting an image of an object to be measured so that outputs of the main scales are in correspondence with each other, the boundary line is permitted to be passed perpendicularly to the respective passel trains. Thus, the measurement accuracy is further improved.

In addition, in the case where one pixel train group is constituted by the first and second pixel trains, and a similar pixel group is further provided in a direction perpendicular thereto, it is possible to measure, at the same time, dimensions in two directions of an object to be measured.

As described above, in accordance with an image pickup device according to this invention, there is employed an arrangement such that a pixel train is further provided as the vernier in addition to a pixel train as the main scale to measure the dimension of an object to be measured from the position differences between a plurality of pixels on which the boundary line of a projected image of the object to be measured is passed. Accordingly, it is possible to measure the dimension of an object to be measured finer than the pitch of each pixel. Thus, high measurement accuracy is provided.

Particularly in the case where there are provided, as the vernier, N number pixel trains each comprised of pixels arranged at a pitch of (N−1) Pm/N and such pixel trains are arranged in a manner that they are shifted by Pm/N in succession in one direction, when attention is drawn to the portion along the boundary line of a projected image, there exist pixels of which outputs suddenly interchange. Accordingly, by recognizing the positions of such pixels, it is possible to determine the dimension of the object to be measured with the accuracy of Pm/N.

DETAILED DESCRIPTION OF THE PREFERRED EMBODIMENTS

Preferred embodiments of an image pickup device for dimensional measurement according to this invention will now be described with reference to the attached drawings.

Figure 1:
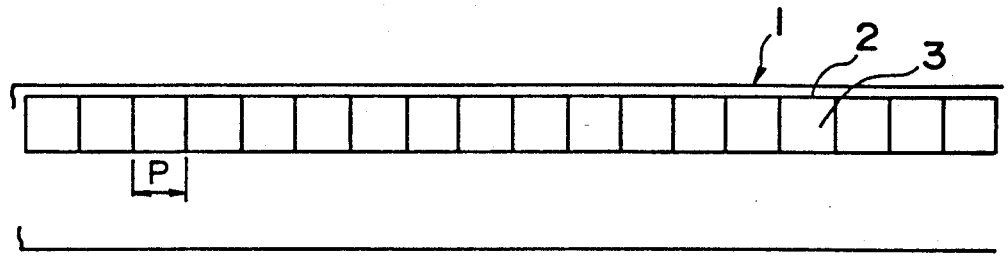
FIG. 1 is a schematic diagram showing a pixel arrangement of a conventional image pickup device for dimensional measurement.
Figure 2:
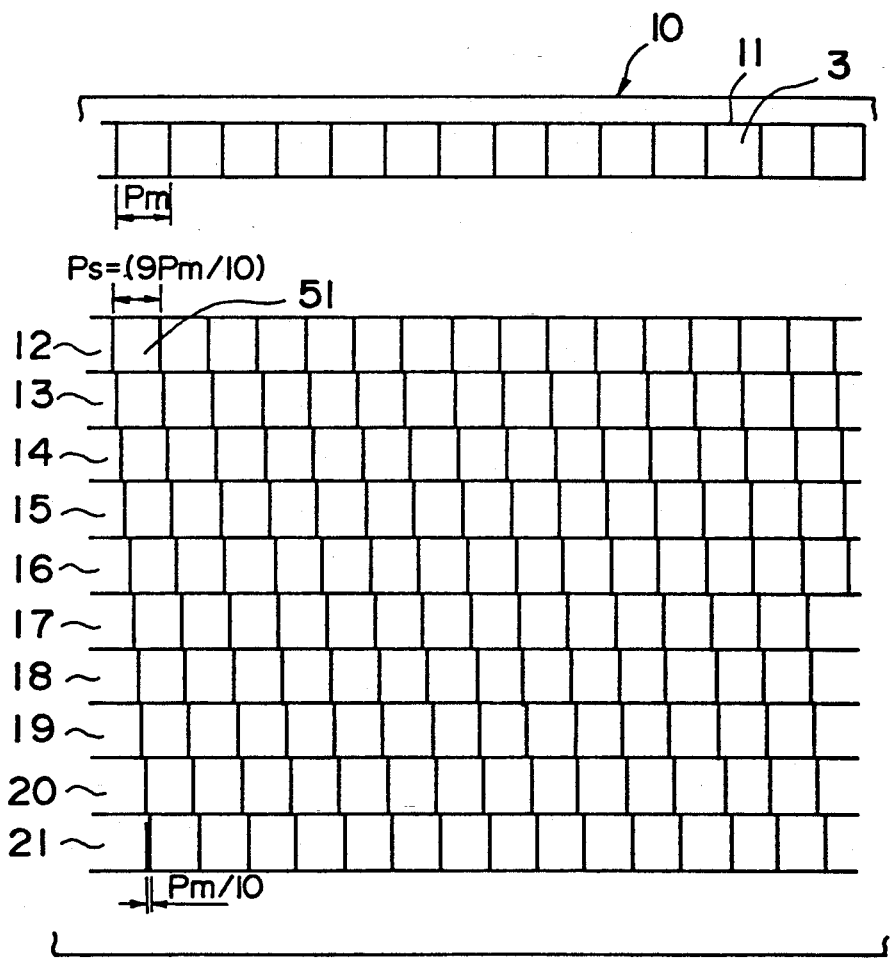
FIG. 2 is a schematic diagram showing a pixel arrangement of an image pickup device for dimensional measurement according to a first embodiment of this invention.
Figure 3:
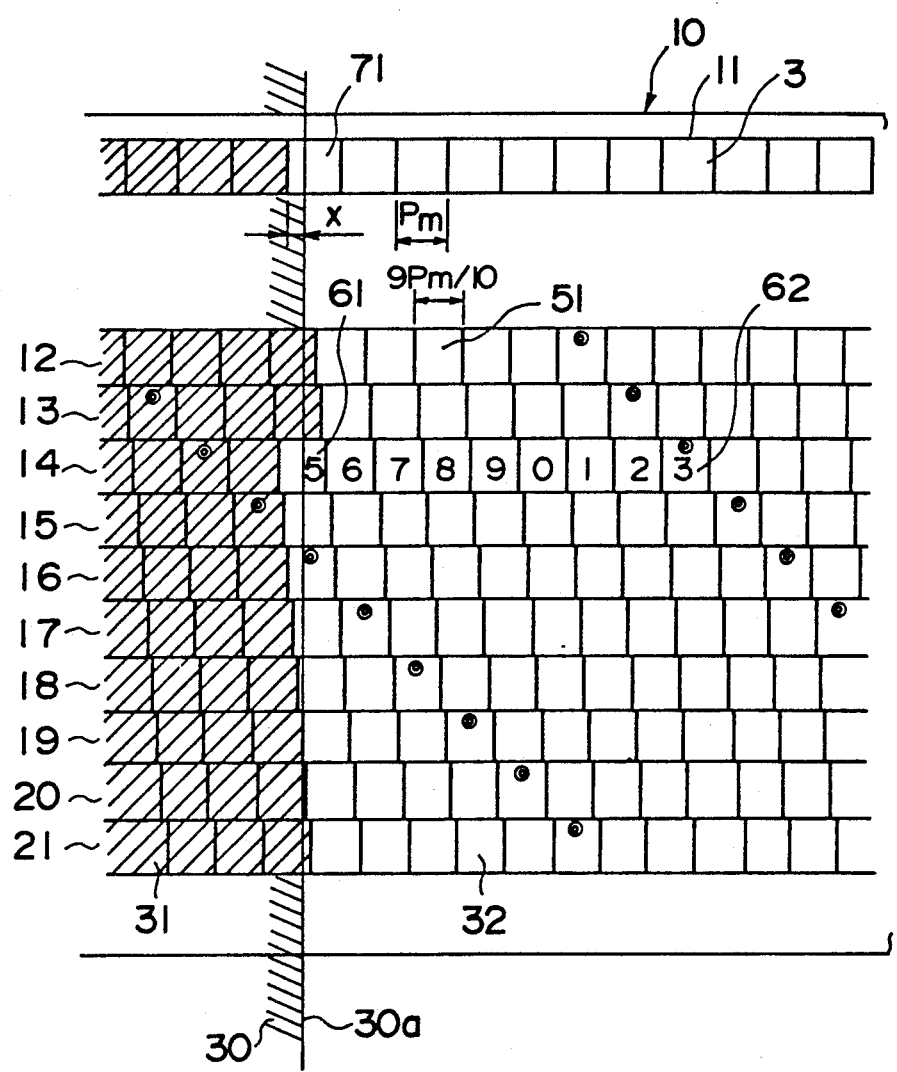
FIG. 3 is an explanatory view showing the state where an image of an object to be measured is projected onto respective pixel trains of the image pickup device of the first embodiment shown in FIG. 2.

Referring to FIGS. 2 and 3, there is shown an example of the pixel arrangement of an image pickup device for dimensional measurement according to a first embodiment of this invention. In the same manner as in the conventional image pickup device 1, the image pickup device of this embodiment includes a pixel train 11 comprised of pixels 3 arranged at a pitch Pm. The pixel train 11 is assumed to serve as the main scale. The image pickup device of this embodiment further includes 10 pixel trains 12 to 21 as the vernier. These pixel trains 12 to 21 are such that pixels 51 are arranged at a pitch Ps (=9Pm/10) different from that of the main scale. Furthermore, respective pixel trains 12 to 21 are arranged in parallel to the pixel train 11 of the main scale in a manner that they are shifted in a right direction by Pm/10.

The operation of such an image pickup device 10 according to the first embodiment will now be described in connection with the case where this image pickup device 10 is used as a CCD line image sensor to carry out dimensional measurement. FIG. 3 shows the state where an image of an object to be measured is projected onto the image pickup device 10. It is now assumed that an image 30 of an object to be measured is vertically projected onto respective pixel trains 11 to 21 in order to increase the measurement accuracy. Each pixel 51 has a binary output. There exists a threshold value for judgment between white and black at the portion where the projection area occupies 50% on the pixels. Further, "⊙" are attached to pixels in phase with the pixel train 11 of the main scale of the pixel trains vernier.

An image 30 of the object to be measured is projected onto respective pixels. Thus, there are formed a region 31 of the black output to which hatches inclined in a right direction are implemented and a region 32 of the white output. The pixel trains 12 to 21 are arranged, as described above, in a manner that they are shifted by Pm/10. For this reason, when attention is drawn to the portion in a longitudinal direction of the pixel trains 12 to 21 of the vernier, there exists a pixel 61 where the white output and the black output suddenly interchange. The boundary line 30a of the projected image 30 is passed on the center of the pixel 61.

It is possible to easily find out the position of such a pixel 61 from outputs from the respective pixel trains 11 to 21. Then, by recognizing to what degree the pixel 61 and the pixel 71 on which the boundary line 30a is passed in the main scale are shifted in phase, i.e., at which position on the pixel 71 the boundary line 30a is passed, it is possible to determine the dimension.

In the pixel train 14 where the pixel 61 exists, a value obtained by multiplying the number of pixels from the pixel 61 to the pixel 62 to which "⊙" is attached by Pm/10 corresponds to the position difference. In this instance, since the boundary line 30a of the projected image 30 is passed through the center of the pixel 61, when the pixel 61 is assumed as "5" and pixels arranged in a right direction are assumed as "6", "7" in order, the pixel 62 is represented by "3". Thus, the distance x from the left end of the pixel 71 to the boundary line 30a is expressed as 3 Pm/10. It is seen that the pixel 71 is covered with the projected image 30 by 3 Pm/10 from the left end.

This measurement principle is based on application of vernier caliper. It is to be noted that while a single vernier can be moved in correspondence with an object to be measured in the case of the vernier caliper, the vernier cannot be moved in the case of the line image sensor. For this reason, a measure is taken to instead provide a plurality of verniers staggered bit by bit to equivalently realize movement of the verniers.

As stated above, by recognizing the position of the center of the pixel on which one boundary line 30a of the projected image 30 is passed, measurement can be made with the accuracy of one tenth of the pitch Pm of the pixels of the main scale. Further, since high measurement accuracy is provided without allowing the pixel pitch to be smaller than a value required, S/N can be provided at the same time without decreasing the quantity of charges.

Moreover, in processing outputs from the respective pixel trains 11 to 21, by memorizing the procedure of the above-described processing by the predetermined program, dimensional measurement is automatically conducted.

The above-described first embodiment is only one example, and does not therefore limit this invention. While respective pixel trains are arranged in a manner to be tightly in contact with each other as shown in FIG. 2, e.g., in the above-mentioned first embodiment, such pixel trains may be arranged in a manner that they are spaced as long as they are in parallel to each other. Similarly, with respect to the direction of the pixel train (in left and right directions in the figure), respective pixels may be arranged with a fixed spacing therebetween. Furthermore, while it is described that the pitch Ps of the vernier is set to a value nine tenths of the pitch Pm of the main scale, this invention is not limited to such a dimensional relationship. For example, the ratio of the pitch Ps of the vernier to the pitch Pm of the main scale may be set to an arbitrary value such as 7/8 or 19/20, etc. In that case, it is preferabe to provide eight pixel trains or twenty pixel trains of the vernier, respectively.

Meanwhile, there are instances where it is difficult to allow the projected image 30 to be vertical to the respective pixel trains 11 to 21. In such instances, as in a second embodiment shown in FIG. 4, an employment of the arrangement in which a single pixel train 81 of the main scale is added in a manner that it has the same train as the main scale 11 on the opposite side of the vernier is effective. In this arrangement, an approach is employed to adjust an angle so that output values of the pixel trains 11 and 81 serving as two main scales are in correspondence with each other to change an angle of a projected image with respect to the respective pixel trains 11 to 21, and 81, thereby permitting the projected image 30 to be vertical to the respective pixel trains 11 to 21.

While the threshold value where the white output and the black output of the respective pixels interchange is set in correspondence with the case where 50% of pixels are covered by a projected image in this embodiment, the covering ratio may be different from the above-mentioned value. By changing the method of counting the number of pixels in accordance with the threshold value, dimensional measurement may be similarly carried out.

Figure 4:
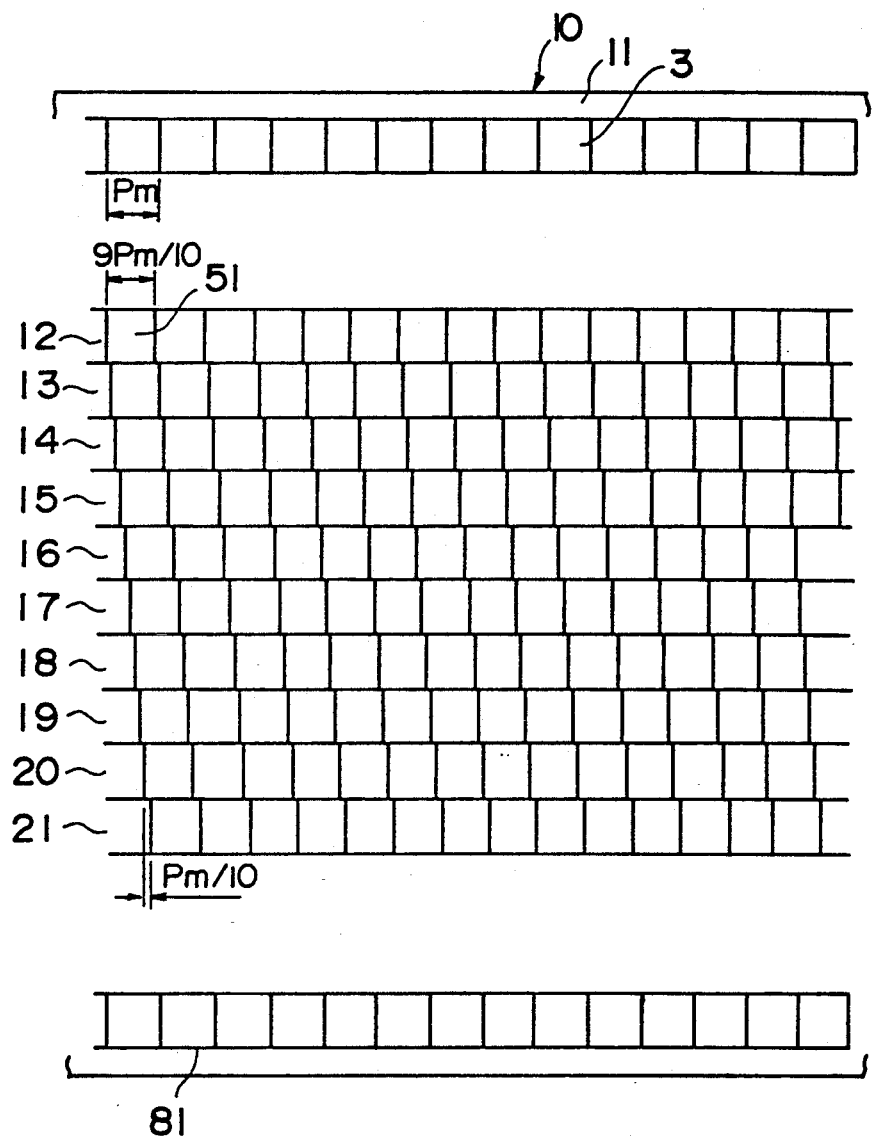
FIG. 4 is a schematic diagram showing a pixel arrangement of an image pickup device for dimensional measurement according to a second embodiment of this invention.

In addition to pixel train 11 to 21 or 81 group as shown in FIG. 2 or FIG. 4, a similar pixel train group is arranged in a vertical direction, thus making it possible to carry out dimensional measurement of an object to be measured in two directions at the same time.

What is claimed is:

1. An image pickup device for dimensional measurement, comprising:
    a first pixel train group having a first pixel train and a plurality of second pixel trains, wherein said first pixel train serves as a first main scale, comprised of pixels arranged at a pitch Pm, and wherein said second pixel trains serve as a vernier scale, in which each of said second pixel trains is comprised of a plurality of pixels arranged at a pitch Ps different from said pitch Pm, and disposed in parallel to said first pixel train, and wherein said second pixel trains are staggered and disposed in a parallel arrangement.

2. An image pickup device as set forth in claim 1, wherein said second pixel trains include at least two pixel trains, respective pixels in said two pixel trains being staggered in such a manner that a boundary between two adjacent pixels in any one of said two pixel trains is not aligned with the boundary between two adjacent pixels in any other of said two pixel trains.

3. An image pickup device as set forth in claim 2, wherein said second pixel trains include N pixel trains, each comprised of a plurality of pixels arranged at a pitch Ps equal to $(N-1) Pm/N$ (N is an integer equal to 3 or more), each of said N pixel trains being arranged in a manner such that said N pixel trains are successively shifted by $Pm/N$ in one direction.

4. An image pickup device as set forth in claim 1, which further comprises a third pixel train serving as a second main scale comprised of a plurality of pixels arranged at said pitch Pm, and disposed in parallel to said first pixel train.

5. An image pickup device as set forth in claim 1, further comprises a second pixel train group disposed in a direction perpendicular to said first pixel train group.

6. An image pickup device as set forth in claim 1, which further comprises:
    a third pixel train serving as a second main scale comprised of pixels arranged at said pitch Pm, and disposed in parallel to said first pixel train; and
    a second pixel train group disposed in a direction perpendicular to said first pixel train group.

7. An image pickup device as set forth in claim 2, which further comprises a third pixel train serving as a second main scale comprised of pixels arranged at said pitch Pm, and disposed in parallel to said first pixel train.

8. An image pickup device as set forth in claim 3, which further comprises a third pixel train serving as a second main scale comprised of pixels arranged at said pitch Pm, and disposed in parallel to said first pixel train.

9. An image device as set forth in claim 2, further comprises a second pixel train group disposed in a direction perpendicular to said first pixel train group.

10. An image pickup device as set forth in claim 3, further comprises a second pixel train group disposed in a direction perpendicular to said first pixel train group.

11. An image pickup device as set forth in claim 2, which further comprises:
    a third pixel train serving as a second main scale comprised of pixels arranged at said pitch Pm, and disposed in parallel to said first pixel train; and
    a second pixel train group disposed in a direction perpendicular to said first pixel train group.

12. An image pickup device as set forth in claim 3, which further comprises:
    a third pixel train serving as a second main scale comprised of pixels arranged at said pitch Pm, and disposed in parallel to said first pixel train; and
    a second pixel train group disposed in a direction perpendicular to said first pixel train group.

* * * * *